Aug. 4, 1964 E. BAUMANN 3,143,040
HOB HEAD WITH TANGENTIAL SLIDE ON HOBBING MACHINES
Filed July 18, 1961 3 Sheets-Sheet 1

INVENTOR.
Erich Baumann
BY
Cushman, Darby & Cushman
ATTORNEYS

Aug. 4, 1964  E. BAUMANN  3,143,040
HOB HEAD WITH TANGENTIAL SLIDE ON HOBBING MACHINES
Filed July 18, 1961  3 Sheets-Sheet 2
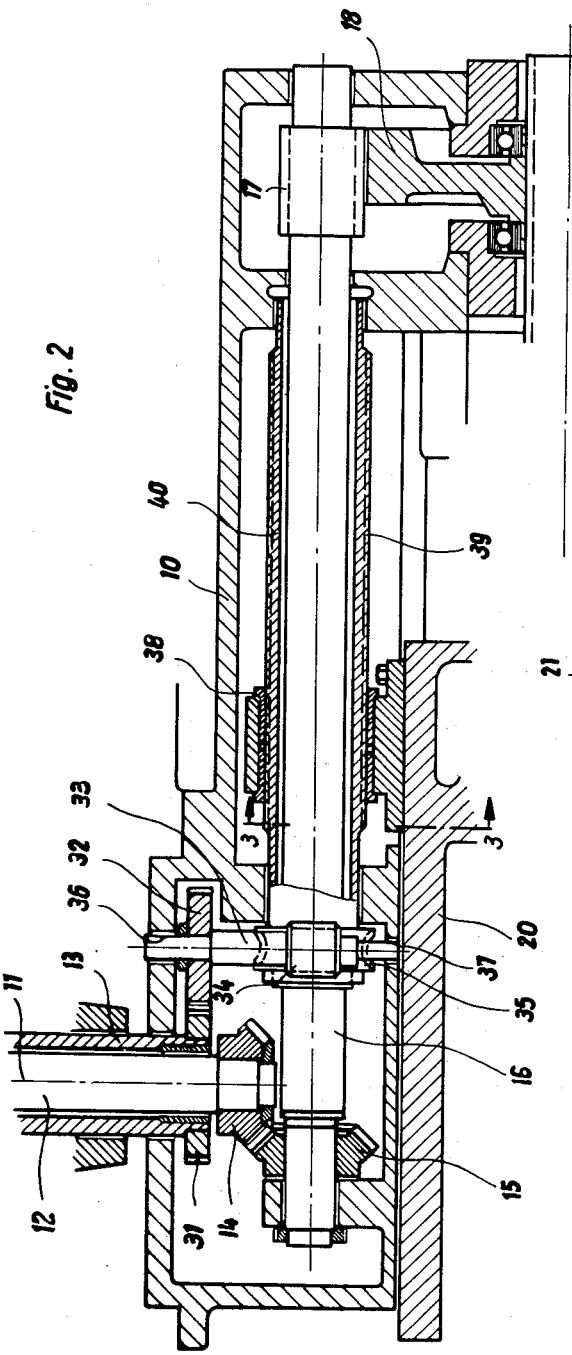
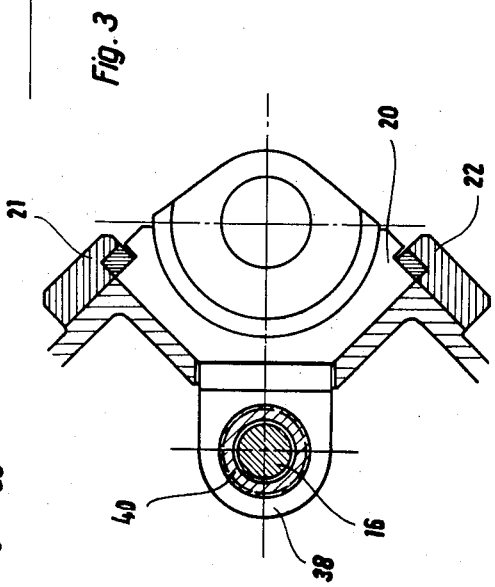
INVENTOR.
ERICH BAUMANN
BY
Cushman, Darby & Cushman
ATTORNEYS Aug. 4, 1964   E. BAUMANN   3,143,040
HOB HEAD WITH TANGENTIAL SLIDE ON HOBBING MACHINES
Filed July 18, 1961   3 Sheets-Sheet 3

INVENTOR.
*Erich Baumann*
BY
*Cushman, Darby & Cushman*
ATTORNEYS

United States Patent Office 3,143,040
Patented Aug. 4, 1964

3,143,040
HOB HEAD WITH TANGENTIAL SLIDE ON HOBBING MACHINES
Erich Baumann, 44 Brenzstrasse, Ludwigsburg, Wurttemberg, Germany
Filed July 18, 1961, Ser. No. 124,824
6 Claims. (Cl. 90—4)

The present invention relates to improvements in the drive for hob spindles in hobbing machines especially those machines directed to the use of a tangential method of hobbing worm gears, and a diagonal method of hobbing spur and helical gears wherein it is necessary to move the hob tangentially to the work.

This improved type of hob drive can be used in hobbing macihnes employing either the step-by-step method of shifting the hob or the continuous feed method.

The hob head is swivelly mounted on the hob slide about a horizontal axis of the hobbing machine and carries the tangential feed slide which permits the hob to be moved longitudinally of its axis of rotation.

Previously when hobbing gears by the tangential method, one had to exchange the hob head without a tangential slide, customarily used in the past because of its greater stability, with a hob head having a tangential slide. This latter hob head met the demands for the hobbing of worm gears by the tangential method due to the presence of smaller forces in this hobbing operation, but was insufficient for the hobbing of spur and helical gears due to the presence of greater hobbing forces.

The introduction of the diagonal method for hobbing spur and helical gears wherein the hob moves simultaneously in both an axial and a tangential direction made it necessary to design a more stable hob head with a tangential slide which would allow both of these hobbing methods. Such a hob head requires two separate driving means, one being for the hob itself, and the other for the feed shaft of the tangential slide so as to give a longitudinal movement to the slide when desired.

One disadvantage in the construction of the previous hob drives for use with both the tangential and diagonal method of hobbing was that the feed spindle for the tangential slide was placed outside the symmetrical plane of the hob head, such plane being defined by the inersecting axes of the swivelling hob head and the hob spindle. This embodiment caused one-sided actuating of the feed forces and resulted in the cocking of the tangential slide in its guide ways thus hampering the operation of the slide.

Other hob drives, in order to overcome this disadvantage, were constructed with the drive shaft for the tangential slide in the symmetrical plane of the hob head parallel to both the intermediate hob drive shaft and the hob spindle. This too presented a disadvantage in that the hob extended too far to the front of the head, thereby unfavorably influencing its rigidity.

Another disadvantage encountered in previous machines was in the placing of the drive shafts for both the tangential slide and the hob spindle on the same axis, but extending such shafts in opposite directions thus reducing the aforementioned unfavorable influence of the rigidity of the head and also locating the feed spindle for the tangential slide midway between the guide ways of the slide in the symmetrical plane of the hob head, but providing, however, an overbalancing effect seriously affecting the movement of the head about its swivel axis due to the increased length of this type of hob head.

It is the object of this invention to overcome all of these disadvantages by providing in a hob drive a pair of concentric driving shafts, the first such shaft for driving the hob, the second and outer shaft for driving the feed shaft connected with the tangential slide.

Another object of this invention is to provide a second pair of concentric intermediate shafts for directly transmitting power to the hob spindle and for giving movement to the tangential slide.

Another object of this invention is to construct these concentric shafts such that the outer shaft of the first pair drives the outer feed shaft of the second pair and the inner shaft of the first pair drives the intermediate hob drive shaft of the second pair.

Another object of this invention is to provide a hob drive in which the outer concentric feed shaft imparts a longitudinal movement to the tangential slide while an inner concentric intermediate hob drive shaft provides a rotatable drive to the hob spindle and hob itself.

Another object of this invention is to locate the axis of the feed shaft for the tangential slide and the axis of the hob spindle in the symmetrical plane of the hob head, thus overcoming the unsymmetrical feed forces of prior machines and preventing the cocking of the tangential slide in its guide ways.

A further object of this invention is to provide means for mounting the hob spindle in the tangential slide thus allowing the longitudinal motion of the hob spindle integral with that of the tangential slide.

A still further object of this invention is to mount the tangential slide in guide ways equidistant above and below the symmetrical plane of the hob head.

To enable one skilled in the art to better understand the features of this invention, I have provided the following drawings:

FIGURE 2 is a horizontal section through the symmetrical plane of the hob head; and, FIGURE 3 is a vertical section taken along lines 3—3 of FIGURE 2;

Figure 1:
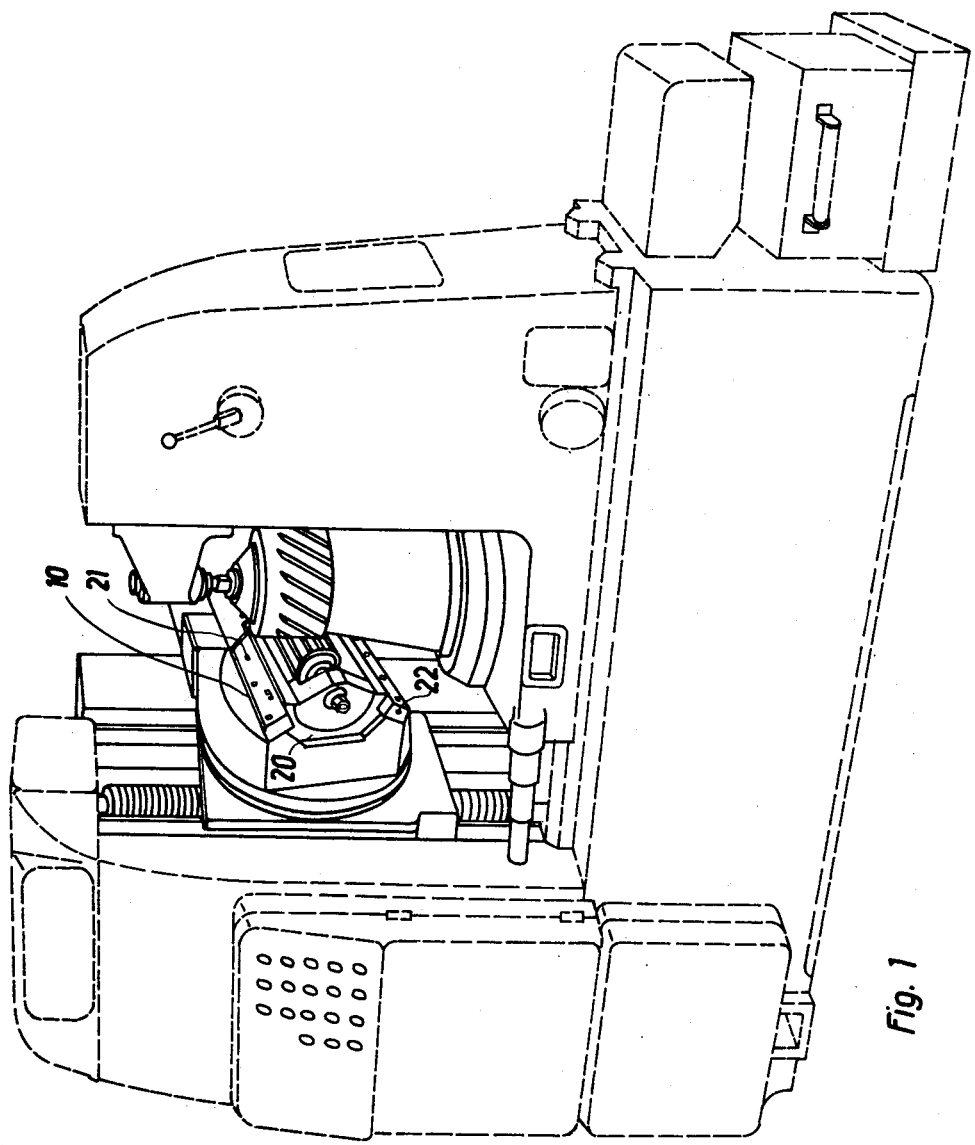
FIGURE 1 is a schematic drawing of a hobbing machine showing the relative placement of the hob head and tangential slides therein with respect to the machine.
Figure 4:
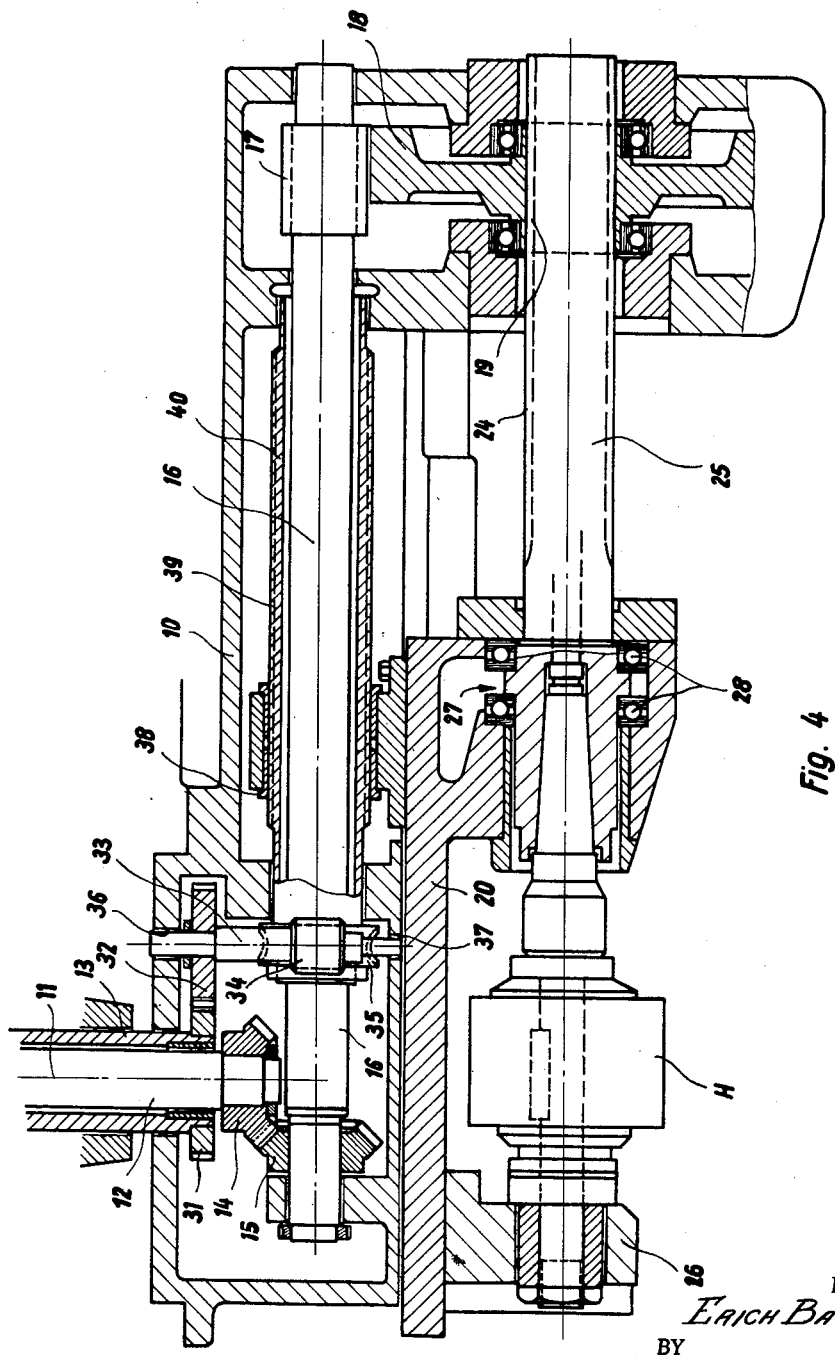
FIGURE 4 is a more detailed view, showing the mounting of the hob spindle in the tangential slide.

Referring to FIGURE 1 of the drawings, there is shown schematically a hobbing machine utilizing the hob drive of this invention. In the solid line of FIGURE 1, the hob head is shown at 10, the head having a tangential slide 20 mounted in guide-ways 21 and 22. The hob head is mounted on the hobbing machine in the usual manner, thus allowing the head to be moved axially with respect to the work.

As shown in FIGURE 2, the head swivels about the axis 11, of shaft 12, said axis being horizontally positioned relative to the base of the machine.

The dual drives for the hob are transmitted to the head by means of concentric driving shafts 12 and 13 coming out of the head column. The axis of these concentric shafts corresponds to the swivelling axis of the hob head. The drive shaft 12 transmitting the power for the rotation of the hob H is connected through beveled gears 14 and 15 to an intermediate hob drive shaft 16, the axis of which intersects at right angles the swivelling axis 11 of the hob head, these axes thus defining the symmetrical plane of the hob head. This intermediate hob drive shaft 16 has positioned at its opposite end a spur gear 17 cooperating with spur gear 18 drivably connected with the hob spindle 25.

The hob H is secured to rotate with the hob spindle 25 in the usual manner. The hob spindle is provided with splines 24 on its outer periphery which cooperate with keys 19 within the hub of spur gear 18 thus permitting the hob spindle to be rotated by the spur gear and to be moved longitudinally with respect thereto.

The drive for the tangential slide 20 is brought out of the hob head column by the outer concentric drive shaft 13 through cooperating spur gears 31 and 32 to a parallel worm gear shaft 33 supported in bearings 36 and 37 positioned in the hob head housing.

The worm gear, 34, secured to rotate with worm shaft 33, cooperates with the worm wheel 35 secured to rotatably drive the feed shaft 40 concentric with the intermediate hob drive shaft, 16. This concentric feed shaft 40 is provided on its outer periphery with suitable threads 39. Feed nut 38 securely attached to the tangential slide 20 is arranged to releasably cooperate with the threads 39 to move the tangential slide as desired.

The tangential slide 20 is mounted for longitudinal movement in the guideways 21 and 22 located within the hob head, equidistant above and below the symmetrical plane of the hob head. The hob spindle 25 mentioned heretofore is rotatably and longitudinally mounted within the tangential slide. At the outer end of the tangential slide there is mounted a bearing 26 which supports the outboard end of the hob spindle. At 27 in the tangential slide, there are radial and thrust bearings 28 lending additional support to the hob spindle. The axes of the feed shaft 40 and the concentric intermediate hob drive shaft 16 as well as the axis of the hob spindle 25 are located in the aforementioned defined symmetrical plane of the hob head, that is, midway between the guideways 21 and 22 of the tangential slide.

In operation, the drive for the hob is brought out of the hob head column by concentric drive shafts 12 and 13. The inner shaft 12 transmits its drive through beveled gears 14 and 15 to an intermediate hob drive shaft 16 from which it is transferred by cooperating spur gears 17 and 18 to the hob spindle 25. The outer drive shaft 13 transmits its torque through the spur and worm gear assemblies 31, 32, 33, 34, and 35 to the feed shaft 40 for transfer to the tangential slide carrying the hob spindle and thereby imparting a longitudinal movement to the hob spindle as desired in either a continuous motion or in a step-by-step movement.

This present invention discloses an improved method for driving a hob by using a plurality of concentric drive shafts to achieve the necessary movements of the hob and the tangential slide in the hobbing of gears in both the tangential and the diagonal methods.

The advantages of this improved type of hob drive are the increased rigidity of the hob head by the construction of a smaller and more compact unit, and the minimization of asymmetrical feed forces acting on the tangential slide, thereby preventing the cocking of the slide in its guides.

The hob drive, according to this invention, can be used for the step-by-step shifting of the hob as in the tangential method of hobbing to obtain a more uniform use of the hob teeth, as well as the continuous moving of the hob as in the diagonal method of hobbing.

The above-mentioned advantages are valid to the same extent for the submitted invention as compared to the known types of hob drives which serve exclusively for the step-by-step shifting of the hob and wherefore the hobbing of worm wheels in the tangential method and the hobbing of spur and helical gears in the diagonal method is not possible.

This application is a continuation-in-part of my co-pending application Serial No. 120,728 filed June 29, 1961, now abandoned, having the identical title.

Having thus described my invention, what I claim is:

1. In the hob head of a hobbing machine an improved drive for a hob comprising a first pair of concentric drive shafts, a second pair of concentric driven shafts, a means for connecting said first pair of concentric drive shafts to said second pair of concentric driven shafts, a third driven shaft, means of connecting said third driven shaft to one shaft of said second pair of concentric driven shafts, axes of said third driven shaft and said second pair of concentric driven shafts being in the same symmetrical plane of the hob head, a slide, means for connecting said slide to the other shaft of said second pair of concentric driven shafts, means for mounting said slide with respect to the above said plane, means on said slide of mounting said third driven shaft and a hob mounted for rotation on said third driven shaft, said hob being rotated when one shaft of said first pair of drive shafts is rotated and moved axially when the other shaft of said first pair of drive shafts is rotated.

2. In the hob head of a hobbing machine an improved drive for a hob comprising a first pair of concentric drive shafts, a second pair of concentric driven shafts, gears for connecting the outer shaft of said first pair of concentric drive shafts to the outer shaft of said second pair of concentric driven shafts, gears for connecting the inner shaft of said first pair of concentric drive shafts to the inner shaft of said second pair of concentric driven shafts, a third driven shaft, gears connecting said third driven shaft to the inner shaft of said second pair of concentric driven shafts, axes of said third driven shaft and said second pair of concentric driven shafts being in the same symmetrical plane of the hob head, a tangential slide, means operatively connecting said tangential slide to the outer shaft of said second pair of concentric driven shafts, means for mounting said tangential slide with respect to above said plane, means on said tangential slide of mounting said third driven shaft, and a hob mounted for rotation on said third driven shaft, said hob being rotated when the inner shaft of said first pair of concentric drive shafts is rotated and moved axially when the outer shaft of said first pair of drive shafts is rotated.

3. In the hob head of hobbing machine an improved drive for a hob comprising a first pair of concentric drive shafts, a second pair of concentric intermediate driven shafts, gears connecting the outer shaft of said first pair of concentric drive shafts to the outer shaft of said second pair of concentric intermediate driven shafts, gears for connecting the inner shaft of said first pair of concentric drive shafts with inner shaft of said second pair of concentric intermediate driven shafts, a third driven spindle shaft, gears connecting said third driven spindle shaft to said inner shaft of said second pair of concentric intermediate driven shafts, axes of said third driven spindle shaft and said second pair of concentric intermediate driven shafts being in the same plane, a tangential slide, means operatively connecting said tangential slide to said outer shaft of said second pair of concentric intermediate driven shafts, means for mounting said tangential slide with respect to above said plane, means on said tangential slide of mounting said third driven spindle shaft, and a hob mounted for rotation on said third driven spindle shaft, said hob being rotated when the inner shaft of said first pair of concentric drive shafts is rotated and moved axially when the outer shaft of said first pair of drive shafts is rotated.

4. In the hob head of a hobbing maching an improved drive for a hob, comprising a first pair of concentric drive shafts, a second pair of concentric intermediate driven shafts, said second pair of concentric intermediate driven shafts comprising a hollow feed shaft surrounding an intermediate hob drive shaft, gears connecting the outer drive shaft of said first pair of concentric drive shafts to said hollow feed shaft, gears connecting the inner drive shaft of said first pair of concentric drive shafts with said intermediate hob drive shaft, a hob spindle, a hob mounted for rotation on said hob spindle, gears connecting said hob spindle to said intermediate hob drive shaft, axes of said hob spindle and said hollow feed shaft being in the same plane, a tangential slide, means operatively for connecting said tangential slide to said hollow feed shaft, means for mounting said tangential slide with respect to above said plane, means on said tangential slide of mounting said hob spindle to allow longitudinal and rotational motion of said hob spindle when said first pair of concentric drive shafts is rotated.

5. In the hob head of a hobbing machine an improved drive for a hob, comprising a first pair of concentric drive shafts, a second pair of concentric intermediate driven shafts, said second pair of concentric intermediate driven shafts comprising an externally threaded hollow feed shaft, surrounding an intermediate hob drive shaft, spur gears cooperating with a worm gear assembly connecting the outer drive shaft of said first pair of concentric drive shafts to said externally threaded hollow feed shaft, beveled gears for connecting the inner drive shaft of said first pair of concentric drive shafts to said intermediate hob drive shaft, a splined hob spindle having thereon a hub-keyed spur gear, a second spur gear cooperating with said first hub-keyed spur gear connecting said splined hob spindle to said intermediate hob drive shaft, axes of said splined hob spindle and said externally threaded hollow feed shaft being in the same plane, a hob mounted for rotation on said hob spindle, a tangential slide, a feed nut for connecting said tangential slide to said externally threaded hollow feed shaft, means for mounting said tangential slide with respect to above said plane, bearings in said tangential slide through which pass said splined hob spindle allowing longitudinal and rotational motion of said splined hob spindle with respect to the hob head when said first pair of concentric drive shafts is rotated.

6. In the hob head of a hobbing machine an improved drive for a hob comprising a first pair of concentric drive shafts, a second pair of concentric intermediate driven shafts, said second pair of concentric intermediate driven shafts comprising an externally threaded hollow feed shaft surrounding an intermediate hob drive shaft, cooperating spur gears in combination with an axially parallel worm drive and worm gear, connecting the outer drive shaft of said first pair of concentric drive shafts to said externally threaded hollow feed shaft, cooperating beveled gears for connecting the inner drive shaft of said first pair of concentric drive shafts to said intermediate hob drive shaft, a splined hob spindle having thereon a hub-keyed spur gear allowing said hob drive spindle to move longitudinally with respect to said hub-keyed spur gear, said hub-keyed spur gear rotatably connecting said splined hob spindle to said intermediate hob drive shaft, axes of said splined hob spindle and said externally threaded hollow feed shaft being in the same plane, said plane being the symmetrical plane of said hob head, a hob mounted for rotation on said hob spindle, a longitudinally movable tangential slide, an adjustably controlled feed-nut for connecting said longitudinally movable tangential slide to said externally threaded hollow feed shaft, guideways equally spaced above and below said symmetrical plane for mounting of said longitudinally movable tangential slide, radial and thrust bearings located in said longitudinally movable tangential slide supporting said splined hob spindle and permitting of said splined hob spindle longitudinal and rotational movement with said longitudinally movable tangential slide when said first pair of concentric drive shafts is rotated.

References Cited in the file of this patent
UNITED STATES PATENTS

| | | |
|---|---|---|
| 2,537,967 | Carlin | Jan. 16, 1951 |
| 2,891,450 | Freudiger | June 23, 1959 |

FOREIGN PATENTS

| | | |
|---|---|---|
| 1,051,614 | Germany | Feb. 26, 1959 |
| 1,098,789 | Germany | Feb. 2, 1961 |